US012326301B2

(12) United States Patent
Sotirov (10) Patent No.: US 12,326,301 B2
(45) Date of Patent: Jun. 10, 2025

(54) GROUND-BASED THERMAL STORAGE AND HEAT EXCHANGE SYSTEM

(71) Applicant: Noventa Energy Partners Inc., Toronto (CA)

(72) Inventor: Alexander Georgiev Sotirov, Toronto (CA)

(73) Assignee: Noventa Energy Partners Inc., Toronto (CA)

( * ) Notice: Subject to any disclaimer, the term of this patent is extended or adjusted under 35 U.S.C. 154(b) by 184 days.

(21) Appl. No.: 18/298,419

(22) Filed: Apr. 11, 2023

(65) Prior Publication Data

US 2024/0344777 A1 Oct. 17, 2024

(51) Int. Cl.
*F28D 20/00* (2006.01)
*F24T 10/15* (2018.01)

(52) U.S. Cl.
CPC .......... *F28D 20/0052* (2013.01); *F24T 10/15* (2018.05)

(58) Field of Classification Search
CPC ... F28D 20/0052; F28D 20/0043; F24T 10/15
USPC .......................................................... 165/45
See application file for complete search history.

(56) References Cited

U.S. PATENT DOCUMENTS

| | | | | | |
|---|---|---|---|---|---|
| 3,848,427 | A | * | 11/1974 | Loofbourow | F17C 3/005 165/45 |
| 4,054,176 | A | * | 10/1977 | Van Huisen | F03G 4/074 165/45 |
| 4,223,729 | A | * | 9/1980 | Foster | E21B 43/17 166/250.1 |
| 8,281,861 | B2 | * | 10/2012 | Nguyen | E21B 44/02 166/57 |
| 8,430,166 | B2 | * | 4/2013 | Danko | F24T 10/20 166/305.1 |
| 9,285,140 | B2 | * | 3/2016 | Melink | F24T 10/10 |
| 9,310,103 | B2 | * | 4/2016 | Wildig | F24T 10/15 |
| 9,709,337 | B2 | * | 7/2017 | Pilebro | F28D 20/0043 |
| 10,612,864 | B2 | * | 4/2020 | Yang | F28D 20/0052 |
| 11,549,725 | B2 | * | 1/2023 | Heyerdal | F24S 60/00 |
| 11,555,658 | B2 | * | 1/2023 | Yang | F24T 10/17 |
| 11,988,455 | B2 | * | 5/2024 | Larsson | F28D 20/0052 |
| 12,066,012 | B2 | * | 8/2024 | Kalaei | E21B 43/2406 |
| 12,140,028 | B2 | * | 11/2024 | Toews | E21B 7/18 |
| 2005/0006049 | A1 | * | 1/2005 | Ross | F28F 27/02 165/45 |
| 2010/0272515 | A1 | * | 10/2010 | Curlett | E21B 43/17 166/308.1 |
| 2014/0110082 | A1 | | 4/2014 | Suver | |

OTHER PUBLICATIONS

Screen capture from Capture Technologies entitled "Thermal Caissons" 5 pageS, uploaded on Jan. 1, 2021. Retrieved from Internet: <https://capturetech.ca/thermal-caissons> (Year: 2021).

* cited by examiner

*Primary Examiner* — Jon T. Schermerhorn, Jr.
(74) *Attorney, Agent, or Firm* — Harter Secrest & Emery LLP; Michael Nicholas Vranjes (57) ABSTRACT

A ground-based thermal storage and heat exchange system, comprising a core, including a top, a bottom, an outward facing surface, an inward facing surface, and a space formed between the top, the bottom, and the inward facing surface, and a plurality of U-tubes extending outward from the core, wherein a fluid is pumped through the core and the plurality of U-tubes.

20 Claims, 7 Drawing Sheets

GROUND-BASED THERMAL STORAGE AND HEAT EXCHANGE SYSTEM

FIELD

The present disclosure relates to heat exchangers, and more particularly, to ground-based thermal storage and heat exchange systems including a layered pattern of U-tubes to transfer energy between the ground and a fluid.

BACKGROUND

Geo-exchange systems utilize ground source heat exchangers (GSHE) to transfer thermal energy between the ground and an intermediary working fluid which may serve a heat pump for the purpose of regulating the temperature of an interior space or heating domestic water. Vertical closed loop GSHEs are typically comprised of boreholes drilled to depths between 100 and 800 feet below grade, or the ground level or surface. However, current systems require a large amount of usable ground surface area to operate efficiently. Additionally, current systems do not provide variable levels of heat transfer and storage.

Thus, there has been a long-felt need for a ground-based thermal storage and heat exchange system that does not require usable ground surface area and can provide efficient variable heat transfer and storage.

SUMMARY

According to aspects illustrated herein, there is provided a ground-based thermal storage and heat exchange system, comprising a core, including a top, a bottom, an outward facing surface, an inward facing surface, and a space formed between the top, the bottom, and the inward facing surface, and a plurality of U-tubes extending outward from the core, wherein a fluid is pumped through the core and the plurality of U-tubes.

In some embodiments, each U-tube of the plurality of U-tubes extends through a respective through-bore in the core. In some embodiments, each U-tube of the plurality of U-tubes comprises a first end arranged in the space, a second end arranged in the space, and a bend arranged outward of the outward facing surface. In some embodiments, the system further comprises at least one supply header fluidly connected to the first end of one or more U-tubes, and at least one return header fluidly connected to the second end of the one or more U-tubes.

In some embodiments, the system further comprises a primary header, and at least one secondary header including a first end connected to the primary header and a second end, the secondary header arranged to transfer the fluid between the primary header and the plurality of U-tubes. In some embodiments, the at least one secondary header comprises a vertically arranged secondary supply header, and a vertically arranged secondary return header. In some embodiments, the at least one secondary header further comprises a horizontally arranged secondary supply header fluidly connected to the vertically arranged secondary supply header, and a horizontally arranged secondary return header fluidly connected to the vertically arranged secondary return header. In some embodiments, the at least one secondary header is arranged as a coil within the space.

In some embodiments, the system further comprises an auxiliary heat transfer apparatus arranged in the space. In some embodiments, the core is a wet well. In some embodiments, the core is a caisson. In some embodiments, the core is arranged completely in earth. In some embodiments, each U-tube of the plurality of U-tubes is arranged in a borehole in the earth. In some embodiments, the plurality of U-tubes are arranged in a plurality of levels, wherein each level of the plurality of levels is arranged at a distinct elevational position. In some embodiments, the plurality of levels comprises a first level spaced apart from the top in a first axial direction, wherein U-tubes in the first level are arranged substantially perpendicular to the outward facing surface, a second level spaced apart from the first level in the first axial direction, wherein U-tubes in the second level are arranged at an acute angle relative to the outward facing surface, and a third level spaced apart from the second level in the first axial direction, wherein the U-tubes in the third level are arranged substantially parallel to the outward facing surface.

According to aspects illustrated herein, there is provided a thermal storage and heat exchange system arranged at least partially in earth, comprising a core, including a top, a bottom, an outward facing surface, an inward facing surface, and a space formed between the top, the bottom, and the inward facing surface, and a plurality of U-tubes extending outward from the core into a borehole in the earth and comprising a first end arranged in the space, a second end arranged in the space, and a bend arranged in the earth, wherein a fluid is pumped through the core and the plurality of U-tubes.

In some embodiments, each U-tube is fluidly connected to a primary header via one or more secondary headers arranged at least partially in the space. In some embodiments, the plurality of U-tubes are spaced apart from each other and arranged in a plurality of levels, and each level of the plurality of levels is arranged at a distinct elevational position with respect to the core. In some embodiments, the plurality of levels comprises a first level spaced apart from the top in a first axial direction, wherein U-tubes in the first level are arranged substantially perpendicular to the outward facing surface, a second level spaced apart from the first level in the first axial direction, wherein U-tubes in the second level are arranged at an acute angle relative to the outward facing surface, and a third level spaced apart from the second level in the first axial direction, wherein the U-tubes in the third level are arranged substantially parallel to the outward facing surface.

According to aspects illustrated herein, there is provided a thermal storage and heat exchange system, comprising a core, including an outward facing surface, and an inward facing surface forming a space, and a plurality of tubes extending outward from the core, each tube of the plurality of tubes comprising a first end, a second end, and a bend arranged outward of the outward facing surface, wherein the plurality of tubes are spaced apart from each other and arranged in a plurality of levels, and a fluid is pumped through the core and the plurality of tubes.

According to aspects illustrated herein, there is provided a thermal storage and heat exchange system, comprising a core, including an outward facing surface, and an inward facing surface forming a space, and a plurality of U-tubes extending outward from the core, each U-tube of the plurality of U-tubes comprising a first end, a second end, and a bend arranged outward of the outward facing surface, wherein the plurality of U-tubes are spaced apart from each other and arranged in a plurality of levels, and a fluid is pumped through the core and the plurality of U-tubes.

According to aspects illustrated herein, there is provided a closed loop ground-based thermal storage and heat exchange apparatus operatively arranged to provide heating and/or cooling to buildings by leveraging a foundational structure such as a wet well or caisson to function as an anchor for a novel geo-exchange configuration comprises of layers of radial and vertical boreholes distributed along and extending from the circumference and base of the foundational structure.

In some embodiments, the foundational structure is a core comprising a cylindrical shaft. In some embodiments, the core comprises concrete. The core is operatively arranged to act as a support structure for layers of boreholes extending outwards radially from the circumference of the core. In some embodiments, the diameter of the core may range from 3 m to 15 m. In some embodiments, the depth of the core may range from 10 m to 50 m depending on the number of boreholes and corresponding U-tubes or whether the core serves an alternate purpose. For example, the core structure may be a wet well, which is a wastewater and stormwater infrastructure, typically made from concrete, that acts as a temporary storage for wastewater or stormwater before it is pumped elsewhere. In another example, the core structure may be a caisson, which is a cylindrical foundational support structure for a building. In yet another example, the core structure may have an inner shaft area that is used to house one or more thermal storage tanks to augment the thermal storage capabilities of the ground-based thermal storage and heat exchange apparatus, mechanical equipment, and/or electrical equipment.

In some embodiments, boreholes are drilled from the inner circumference of the core at various depths and lengths. In some embodiments, the minimum distance between the top of the core, which is positioned at grade (i.e., at the ground surface or level) and the first layer of boreholes is between 5 m and 15 m, and thus 5-15 m below grade, to ensure that the boreholes do not come into contact with utility lines. In some embodiments, the diameter of the boreholes ranges between 2 inches to 5 inches, or preferably, 2.37 inches to 4.5 inches. U-tubes are arranged in the boreholes. In some embodiments, the U-tubes comprise high density polyethylene (HDPE) or copper. The U-tubes are inserted into the boreholes and may be supported structurally within the boreholes via grout or helical tieback anchors.

In some embodiments, the diameter of the U-tubes ranges between 0.75 inches and 1.5 inches. In some embodiments, the length of the U-tubes ranges between 400 feet and 1,000 feet, depending on the soil properties (i.e., thermal conductivity, thermal diffusivity, and moisture content), and the required thermal capacity per borehole. In some embodiments, certain regions of soil surrounding the core may exhibit superior thermal properties than other regions. Therefore, if the soil conditions are favorable on a certain side or at a certain elevation of the core, the U-tubes penetrating those regions can be either extended or more U-tubes can be concentrated in those regions.

In some embodiments, multiple U-tubes radiating outward from the circumference of the core at the same elevation are connected to a common supply header and return header (i.e., secondary headers). These secondary headers tie into a primary supply header and a primary return header. In some embodiments, the primary supply header and primary return header are arranged at the top of the core structure. In some embodiments, each secondary header (supply and return) is connected to 10 to 12 U-tubes.

In some embodiments, a plurality of secondary headers run vertically or substantially vertically along the inner shaft of the core. As the secondary header moves downwards, working fluid is diverted to layers of U-tubes and the diameter of the secondary headers is reduced in proportion to the reduction in working fluid flowrate. This reduction in diameter of the secondary headers as elevation decreases (i.e., deeper into the core) ensures that a consistent working fluid velocity is achieved in the U-tubes so as not to adversely affect heat transfer between the working fluid and soil surrounding the U-tube. In some embodiments, the vertically arranged secondary headers comprise a constant diameter.

In some embodiments, one set of supply and return secondary header pipes coil or spiral downwards along the inner circumference of the core, similar in shape to a helical spring. In some embodiments, the diameter of the secondary headers is constant. In some embodiments, as the secondary headers coil downwards, the diameter of the secondary headers is reduced in proportion to the reduction in flow.

In some embodiments, a single set of secondary supply and return headers run vertically down along the inner circumference of the core. Tertiary headers takeoff from the supply secondary header, run along the circumference of the core and tie into the return secondary header at the same elevation as the takeoff from the supply secondary header. As a variation, in some embodiments, two vertical secondary headers are arranged on opposite ends of the inner core circumference. Two sets of primary supply and return headers are hydraulically connected to both secondary headers such that a primary header can supply working fluid to either of the secondary headers. The tertiary headers are then split into two independent circuits. This would allow for greater flexibility in how the bore field is utilized. For example, one circuit can be used for heating while the other is used for cooling, or both can be used for heating or cooling, or one circuit can be used for either heating or cooling while the other circuit is not utilized allowing different parts of the bore field to be selectively utilized.

In some embodiments, the layers of U-tubes that are closest to the top of the core are typically horizontal and may also be used for seasonal (long to medium term) thermal storage. For short-term thermal storage, boreholes and corresponding U-tubes near the bottom of the core are used because such U-tubes are arranged closer together and can thus change the temperature (i.e., heat or cool) of the soil therearound faster. For medium and long-term storage, boreholes and corresponding U-tubes near the top of the core are used because such U-tubes are spaced further apart from each other and thus change the temperature of the soil therearound slower. As working fluid is circulated through the U-tubes, thermal energy is either extracted from or rejected to the surrounding soil resulting in a change in the average soil temperature over time.

The horizontal distance between each U-tube in the same elevational layer and the vertical distance between each layer is selected to ensure that the thermal performance of a U-tube is not negatively impacted by adjacent U-tubes (e.g., typically this distance is 4 m along the radially outward facing surface of the core). In some embodiments, the layers of U-tubes closer to the middle and base of the core are angled downwards away from the ground surface, and the U-tubes directly at the base of the core are arranged in vertical boreholes. In some embodiments, the spacing between the U-tubes closer to the base or bottom of the core is approximately 1.5 m along the outward facing surface of the core. Due to the smaller spacing, the U-tubes closer to the base of the core have a stronger impact on the temperature of the surrounding soil and therefore may also be used for short term thermal storage.

In some embodiments, the geo-exchange configuration utilized in the present disclosure may be a closed loop reverse return configuration. In a reverse return configuration, the first U-tube to be supplied working fluid by the supply header is the last U-tube to return working fluid to the return header. Reverse return configurations are typically preferred since they are easier to balance when compared to direct return configurations. In some embodiments, solenoid valves are used to isolate flow to headers and U-tubes allowing the system to vary the temperature of different regions of the bore field depending on the duration of thermal storage required. In some embodiments, the working fluid inside the U-tubes comprises water, refrigerant, a mixture of water and anti-freeze (e.g., propylene glycol), or the like.

In some embodiments, the system may further comprise auxiliary heat addition equipment, such as solar thermal collectors and auxiliary heat rejection such as air-to-water heat exchangers or air cooled chillers, coupled to the primary supply and return headers to provide additional thermal capacity to the system or to balance the bore field. Heat exchange equipment (e.g., a plate-and-frame heat exchanger) may be used to provide separation between the working fluid in/from the U-tubes and the working fluid serving in a heat pump, heat recovery chiller, or radiant floor system. In some embodiments, a water based thermal storage tank is arranged in the core structure to augment the thermal storage capabilities of the system. The thermal storage tank can either be a direct storage tank or indirect storage tank depending on the type of working fluid used in the U-tubes. For example, an indirect storage tank contains an internal heat exchanger to provide hydraulic separation between the water inside the tank and the working fluid inside the U-tubes. An indirect storage tank may be used if the working fluid inside the U-tubes and storage tank is different.

In some embodiments, the ground-based thermal storage and heat exchanger system comprises a plurality of U-tubes anchored to a foundational structure or core. In some embodiments, the core can be in the form of a wet well, structural piles, caissons, and the like, and may serve additional functions beyond acting as an anchor for the system. In some embodiments, each U-tubes is arranged in a respective bore. The plurality of bores known as the bore field is comprised of layers of horizontal, angled, and vertical U-tubes that extend outward radially from the circumference of the core structure and tie into common headers (i.e., secondary headers). In some embodiments. 10-12 U-tubes are connected to a single common secondary header. In some embodiments, each secondary header can be individually isolated using solenoid valves. In some embodiments, the bore field configuration can provide medium-term and long-term thermal storage.

In some embodiments, the following borehole parameters can be altered depending on soil properties (e.g., thermal conductivity, moisture content, diffusivity, etc.) and therefore may vary over a wide range: 1) horizontal distance from the circumference of the core; 2) distance between each borehole, along the outer surface of the core, in a single layer; 3) vertical distance between each layer; 4) number of boreholes per layer; and 5) angle of boreholes with respect to the outer surface of the core and/or grade for each layer.

In some embodiments, the system comprises one or more solenoid valves arranged to isolate individual sections of the bore field (i.e., one or more U-tubes). By isolating different headers (i.e., via valves), the system can be controlled to vary the temperature of different parts of the bore field depending on the duration of thermal storage needed. In some embodiments, the core houses additional equipment such as one or more thermal storage tanks, which can further enhance the overall thermal capacity and efficiency of the system.

These and other objects, features, and advantages of the present disclosure will become readily apparent upon a review of the following detailed description of the disclosure, in view of the drawings and appended claims.

BRIEF DESCRIPTION OF THE DRAWINGS

The accompanying drawings are incorporated herein as part of the specification. The drawings described herein illustrate embodiments of the presently disclosed subject matter and are illustrative of selected principles and teachings of the present disclosure, in which corresponding reference symbols indicate corresponding parts. However, the drawings do not illustrate all possible implementations of the presently disclosed subject matter and are not intended to limit the scope of the present disclosure in any way.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein.

It should be appreciated that the terms "tube" and "header" as used herein is synonymous with hose, pipe, channel, conduit, tube end form, or any other suitable pipe flow used in hydraulics and fluid mechanics. It should further be appreciated that the terms "tube" and "header" can mean a rigid or flexible conduit of any material suitable for containing and allowing the flow of a gas or a liquid.

"Closed loop" as used herein is intended to mean that fluid is trapped in the system and does not leave the tubes.

"Grade" as used herein is intended to mean ground level or the ground surface.

"Short-term storage" as used herein refers to the recollection of heat transfer within a short-term time period, for example, between 24 hours and one week.

"Medium-term storage" as used herein refers to the recollection of heat transfer within a medium-term time period, for example, between one week and one month. Medium-term storage is achieved by adding or removing heat to surrounding soil rapidly, such that the added or removed heat can be recollected within the medium-term time period.

"Long-term storage" as used herein refers to the recollection of heat transfer within a long-term time period, for example, one or more months or between one month and several months. Long-term storage is achieved by adding or removing heat to surrounding soil slowly, such that the added or removed heat can be recollected within the long-term time period.

"Ground-based" as used herein is intended to mean arranged at least partially into the ground, and specifically, arranged at least partially in the earth.

Figure 1:
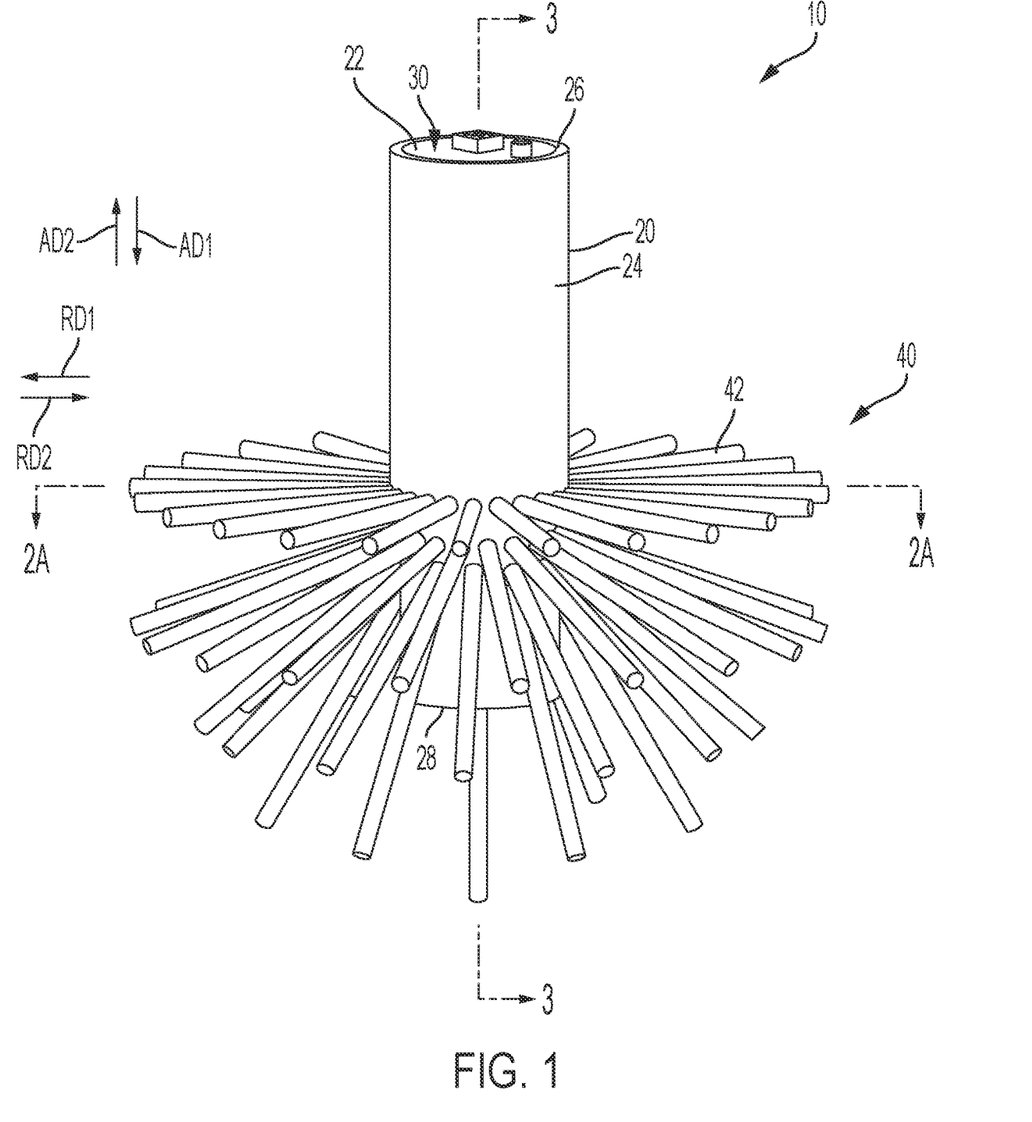
FIG. 1 is a front perspective view of a ground-based thermal storage and heat exchange system.
Figure 2A:
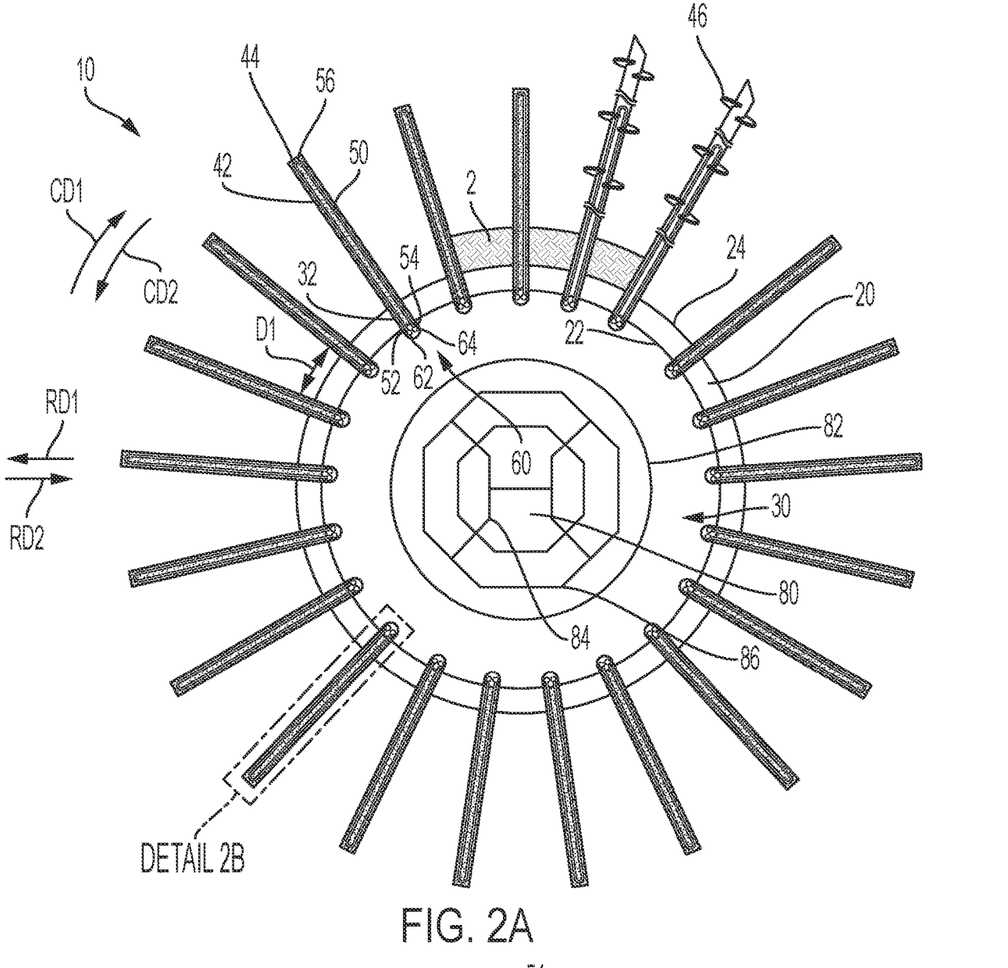
FIG. 2A is a cross-sectional view of the ground-based thermal storage and heat exchange system taken generally along line 2A-2A in FIG. 1.
Figure 2B:
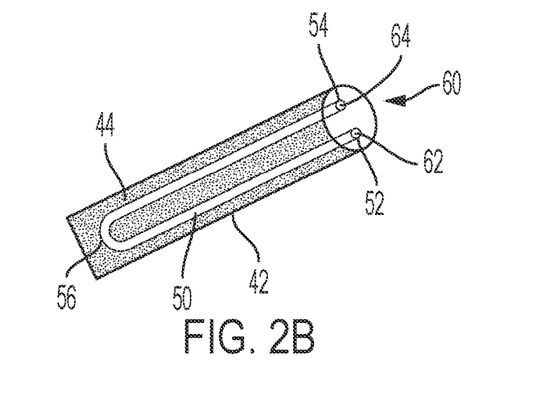
FIG. 2B is a detail view of the ground-based thermal storage and heat exchange system taken generally along Detail 2B.
Figure 3:
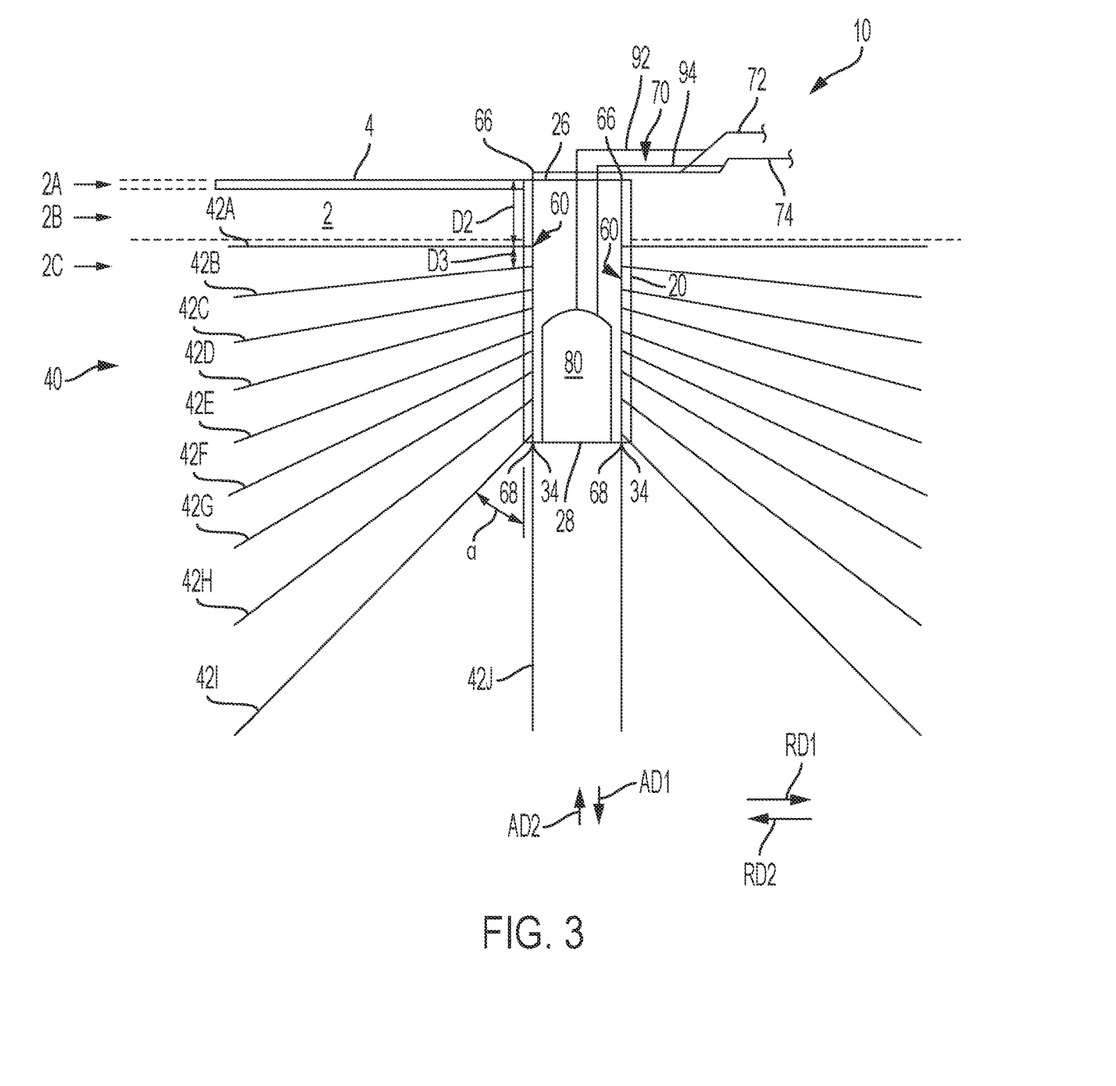
FIG. 3 is a cross-sectional view of the ground-based thermal storage and heat exchange system taken generally along line 3-3 in FIG. 1.
Figure 4:
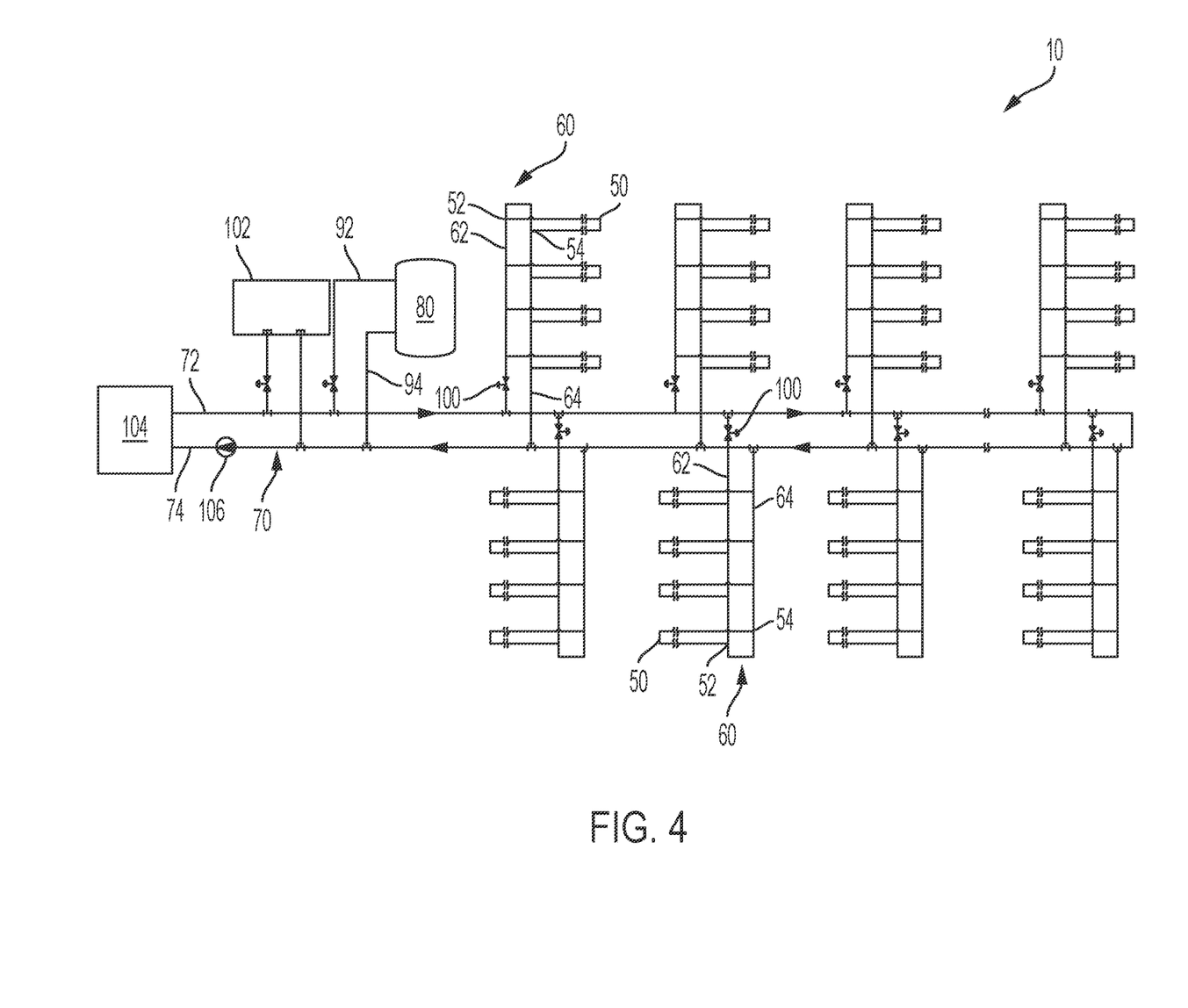
FIG. 4 is a schematic view of the ground-based thermal storage and heat exchange system shown in FIG. 1.

Adverting now to the figures, FIG. 1 is a front perspective view of ground-based thermal storage and heat exchange system 10. FIG. 2A is a cross-sectional view of ground-based thermal storage and heat exchange system 10 taken generally along line 2A-2A in FIG. 1. FIG. 2B is a detail view of ground-based thermal storage and heat exchange system 10 taken generally along Detail 2B. FIG. 3 is a cross-sectional view of ground-based thermal storage and heat exchange system 10 taken generally along line 3-3 in FIG. 1. FIG. 4 is a schematic view of ground-based thermal storage and heat exchange system 10. Ground-based thermal storage and heat exchange system 10, or system 10, is operatively arranged in earth 2 and comprises core 20, a plurality of U-tubes 50, and secondary header 60, 160, 260.

Core 20 is arranged at least partially in earth 2 and comprises radially inward facing surface 22, radially outward facing surface 24, top or top surface 26, and bottom or bottom surface 28. Radially inward facing surface 22 and bottom 28 form space 30. In some embodiments, core 20 is a cylinder with an open top 26 such that space 30 is accessible. In some embodiments, top 26 may be enclosed. In some embodiments, core 20 is arranged completely within earth 2 such that top 26 is flush with or arranged below grade 4, as best shown in FIG. 3. The length of core 20 may be varied to harness the thermal characteristics of earth 2, for example, such that core 20 extends through one or more of top soil 2A, overburden 2B (i.e., the material arranged between the top soil and bedrock), and bedrock 2C. In some embodiments, core 20 comprises concrete. It should be appreciated that, while core 20 is shown as a cylinder, core 20 may comprise any geometry suitable for radially and vertically arranging U-tubes, for example a rectangular prism, cube, cuboid, cone, sphere, pyramid, prism, and the like.

Core 20 comprises a plurality of through-bores extending therethrough. For example, core 20 comprises radial through-bores 32 which extend in radial direction RD1 from radially inward facing surface 22 to radially outward facing surface 24. Such radial through-bores 32 are arranged to align with a respective borehole 42 and engage a respective U-tube 50, as will be described in greater detail below. Similarly, core 20 may comprise one or more through-bores 34 which extend in axial direction AD1 through bottom wall 28. Such axial through-bores 34 are arranged to align with a respective borehole 42 and engage a respective U-tube 50, as will be described in greater detail below.

In some embodiments, core 20 is a wet well. In some embodiments, core 20 is a structural pile. In some embodiments, core 20 is a structural caisson. In some embodiments, core 20 is an anchor for another structure such as a building. Core 20 is formed by digging a hole in earth 2 and pouring into a hollow form (e.g., cylindrical form) below grade 4. In some embodiments, core 20 comprises concrete. In some embodiments, core 20 is further secured in earth 2 via tiebacks, for example, helical tiebacks, which is a retaining wall anchoring system used to horizontally reinforce and stabilize permanent and temporary structures subjected to lateral loads from earth and water. In some embodiments, the diameter of radially outward facing surface 24 ranges between 3 m to 15 m. In some embodiments, the depth or length of core 20 (i.e., from top 26 to bottom 28) ranges between 10 m and 50 m.

Once core 20 is formed and arranged in earth 2, boreholes 42, and through-bores 32 and 34 may be formed. As previously described, each borehole 42 corresponds to a respective through-bore 32, 34 in core 20. Thus, in some embodiments, the through-bores and boreholes are formed together. For example, once core 20 is formed and properly arranged in earth 2, through-bores 32 and respective boreholes 42A are formed by displacement of a drill, arranged in space 30, in radial direction RD1, as shown in FIG. 3. Similarly, through-bores 34 and respective boreholes 42J are formed by displacement of the drill in axial direction AD1.

The plurality of boreholes 42 is referred to as borehole field 40. Borehole field 40 is arranged in layers or levels. For example, and as best shown in FIG. 3, borehole field 40 comprises ten levels of boreholes 42, namely, borehole levels 42A-J. By way of example only, borehole levels 42A-I comprise boreholes 42 that extend from core 20 at least partially in radial direction RD1 (i.e., at least partially horizontally) and borehole level 42J comprises boreholes 42 that extend from core 20 in axial direction AD1 (i.e., vertically). Each borehole 42 comprises a U-tube 50 arranged therein. As such, the arrangement of a borehole 42 is synonymous with the arrangement of a U-tube 50, as will be described in greater detail below. Similarly, a borehole level is synonymous with a U-tube level. In some embodiments, boreholes 42 comprise a diameter ranging from 2 inches to 5 inches, and preferably 2.37 inches to 4.5 inches. In some embodiments, boreholes 42 may vary in depth, or distance from radially outward facing surface 24, and as such U-tubes 50 may also vary in length, in order to achieve optimal heat transfer characteristics.

Boreholes 42 and their respective U-tubes 50 are arranged to facilitate the best heat transfer characteristics. As shown in FIG. 3 each borehole 42 and its respective U-tube 50 is arranged at angle α with respect to core 20, and specifically radially outward facing surface 24. In some embodiments, first borehole level 42A, or the topmost borehole level, comprises a plurality of boreholes 42 and respective U-tubes 50 arranged at 90 degrees with respect to radially outward facing surface 24. Last borehole level 42J, or the bottommost borehole level, comprises one or more boreholes 42 and respective U-tubes 50 arranged at 0 degrees with respect to radially outward facing surface 24. In some embodiments, angle α of boreholes 42 and their respective U-tubes 50 decreases with each borehole level in axial direction AD1. In some embodiments, angle α decreases a minimum of 5 degrees between borehole levels in axial direction AD1. For example, boreholes 42 and their respective U-tubes 50 of borehole levels 42B-I are arranged at 85, 80, 75, 70, 65, 60, 53, and 45 degrees, respectively, with respect to radially outward facing surface 24. In some embodiments, boreholes 42 and their respective U-tubes 50 of borehole levels 42B-42I are arranged at an acute angle with respect to radially outward facing surface 24, and extend radially outward from radially outward facing surface 24 in axial direction AD1, or elevationally downward. The staggered and multi-level design of boreholes 42 and U-tubes 50 achieves excellent heat transfer characteristics since more U-tubes 50 can be utilized at low elevational levels within earth 2 (e.g., deep within bedrock 2C).

In addition to the specific angular agreement described above, boreholes 42 and their respective U-tubes 50 are spaced apart to achieve the best heat transfer characteristics. For example, boreholes 42 and their respective U-tubes 50 are circumferentially spaced along radially outward facing surface 24 by distance D1, as best shown in FIG. 2A. In some embodiments, the circumferential distance D1 between boreholes 42 in a single borehole level is constant. In some embodiments, the circumferential distance D1 between boreholes 42 in a single borehole level varies. Boreholes 42 and their respective U-tubes 50 are also vertically spaced, for example, between borehole levels. Boreholes 42 and respective U-tubes 50 for borehole level 42A is arranged at distance D2 from grade 4 in axial direction AD1. Each subsequent borehole level moving in axial direction AD1 is arranged at distance D3 from the previous borehole level. Distance D3 may be constant between borehole levels, or it may vary.

In some embodiments, distance D1 and distance D3 range between 1.5 m to 4 m. In some embodiments, distance D1 and distance D3 near the top of borehole field 40 (i.e., approximately borehole levels 42A-42C) is 4 m and distance D1 and distance D3 near the bottom of borehole field (i.e., approximately borehole levels 42G-42J) is 1.5 m. Due to the smaller spacing between U-tubes 50 near bottom 28 of core 20 there is a stronger impact on the temperature of the surrounding earth 2, and therefore these bottom U-tubes 50 may be used for short term thermal storage. Contrarily, due to the larger spacing between U-tubes 50 near top 26 of core 20 there is a weaker or lesser impact on the temperature of the surrounding earth 2, and therefore these top U-tubes 50 may be used for long term and/or medium term thermal storage. In some embodiments, distance D2 ranges between 5 m to 15 m to ensure that the boreholes 42 and respective U-tubes 50 do not come into contact with utility lines.

U-tubes 50 extend from core 20 into boreholes 50. U-tube 50 is a pipe shaped like a U and comprises end 52, end 54, and bend 56, as best shown in FIGS. 2A-2B. U-tubes 50 are arranged such that ends 52 and 54 are arranged in space 30 of core 20 (i.e., radially inward of radially inward facing surface 22), and bend 56 is arranged in borehole 42 (i.e., radially outward of radially outward facing surface 24). Each U-tube 50 is connected to secondary header 60, 160, 260 and is arranged to receive fluid therefrom. Specifically, end 52 is connected to secondary supply header 62, 162, 262 and end 54 is connected to secondary return header 64, 164, 264. Fluid flows from secondary supply header 62, 162, 262 into U-tube 50 through end 52, and out of U-tube 50 through end 54 into secondary return header 64, 164, 264. Secondary headers 60, 160, 260 are arranged within core 20 (i.e., radially inward of radially inward facing surface 22). In some embodiments, the diameter of U-tubes 50 range between 0.75 inches to 1.5 inches, depending on the soil properties (i.e., thermal conductivity, thermal diffusivity, and moisture content). In some embodiments, the length of U-tubes 50 (i.e., the distance between end 52, 54 and bend 56) ranges between 400 ft to 1,000 ft depending on the soil properties.

Secondary headers 60, 160, 260 are connected to primary header 70. Specifically, secondary supply header 62, 162, 262 is fluidly connected to primary supply header 72 and secondary return header 64, 164, 264 is fluidly connected to primary return header 74. In some embodiments, primary header 70 is connected to component 104 (see FIG. 4). Component 104 may be, for example, a heat pump, chiller, heat exchanger, or building. Pump 106 circulates fluid through primary header 70, secondary header 60, 160, 260, and U-tubes 50. Primary header 70 may further be connected to an apparatus or system requiring heat transfer (e.g., a building, heat exchanger, heat pump, etc.). The fluid flowing through primary header 70, secondary header 60, 160, 260, and U-tubes 50 comprises desirable heat transfer characteristics. In some embodiments, the fluid is water, refrigerant, a mixture of water and anti-freeze (propylene glycol), or the like.

In some embodiments, system 10 comprises a plurality of vertically arranged secondary headers 60, as shown in FIGS. 2-3. For example, a single secondary supply header 62 extends down through core 20, radially inward of radially inward facing surface 22, and is fluidly connected to ends 52 of the U-tubes 50 of each U-tube level within that vertical line. Similarly, a single secondary return header 64 extends down through core 20, radially inward of radially inward facing surface 22, and is fluidly connected to ends 54 of the U-tubes 50 of each U-tube level within that vertical line. Thus, as shown in FIG. 3, ten U-tubes 50 arranged in borehole levels 42A-J, are connected to a single secondary header 60. In some embodiments, the diameter of secondary header 60 varies. For example, in some embodiments the diameter of secondary supply header 62 and/or secondary return header 64 decreases in axial direction AD1. In some embodiments, the diameter of secondary supply header 62 and/or secondary return header 64 increases in axial direction AD1. In some embodiments, the diameter of secondary supply header 62 and secondary return header 64 is constant.

In some embodiments, and as best shown in FIG. 4, system 10 further comprises one or more valves 100 operatively arranged to provide selective heat transfer. For example, each secondary header supply 62 may be provided with a valve 100. Thus, each secondary header 60 and corresponding U-tubes 50 may be isolated by fully closing its respective valve 100.

In some embodiments, system 10 further comprises auxiliary heat transfer device 80 arranged in core 20, for example, on bottom 28. For example, the auxiliary heat transfer device may comprise solar thermal collectors, auxiliary heat rejection equipment such as air-to-water heat exchangers and chillers, plate-and-frame heat exchanger, thermal storage tank, air cooled chiller, and the like. Such auxiliary heat transfer devices can be coupled to primary supply header 72 and primary return header 74 via conduit 92 and 94, respectively, to provide additional thermal capacity to the system or to balance borehole field 40 (see FIG. 4). For example, and as shown in FIGS. 2-3, system 10 comprises thermal storage tank 80 arranged in space 30. Thermal storage tank 80 comprises outer wall 82, distribution piping, and diffuser 84. In some embodiments, diffuser 84 is an octagonal diffuser. Thermal storage tank 80 may be a direct storage tank or indirect storage tank depending on the type of working fluid used in U-tubes 50. An indirect storage tank may comprise an internal heat exchanger to provide hydraulic separation between the water inside the tank and the working fluid inside U-tubes 50. An indirect storage tank may be used if the working fluid inside U-tubes 50 and storage tank 80 are different.

In some embodiments, and as shown in FIG. 4, system 10 comprises an additional component or auxiliary heat transfer device 102. In some embodiments, the auxiliary heat transfer devices may thermally modify the working fluid in such a way to enhance the thermal performance of the overall system. The auxiliary heat transfer devices may also provide additional thermal storage or aid in balancing borehole field 40. In some embodiments, auxiliary heat transfer device 102 may comprise solar thermal collectors, auxiliary heat rejection equipment such as air-to-water heat exchangers and chillers, plate-and-frame heat exchanger, thermal storage tank, air cooled chiller, and the like.

Figure 5:
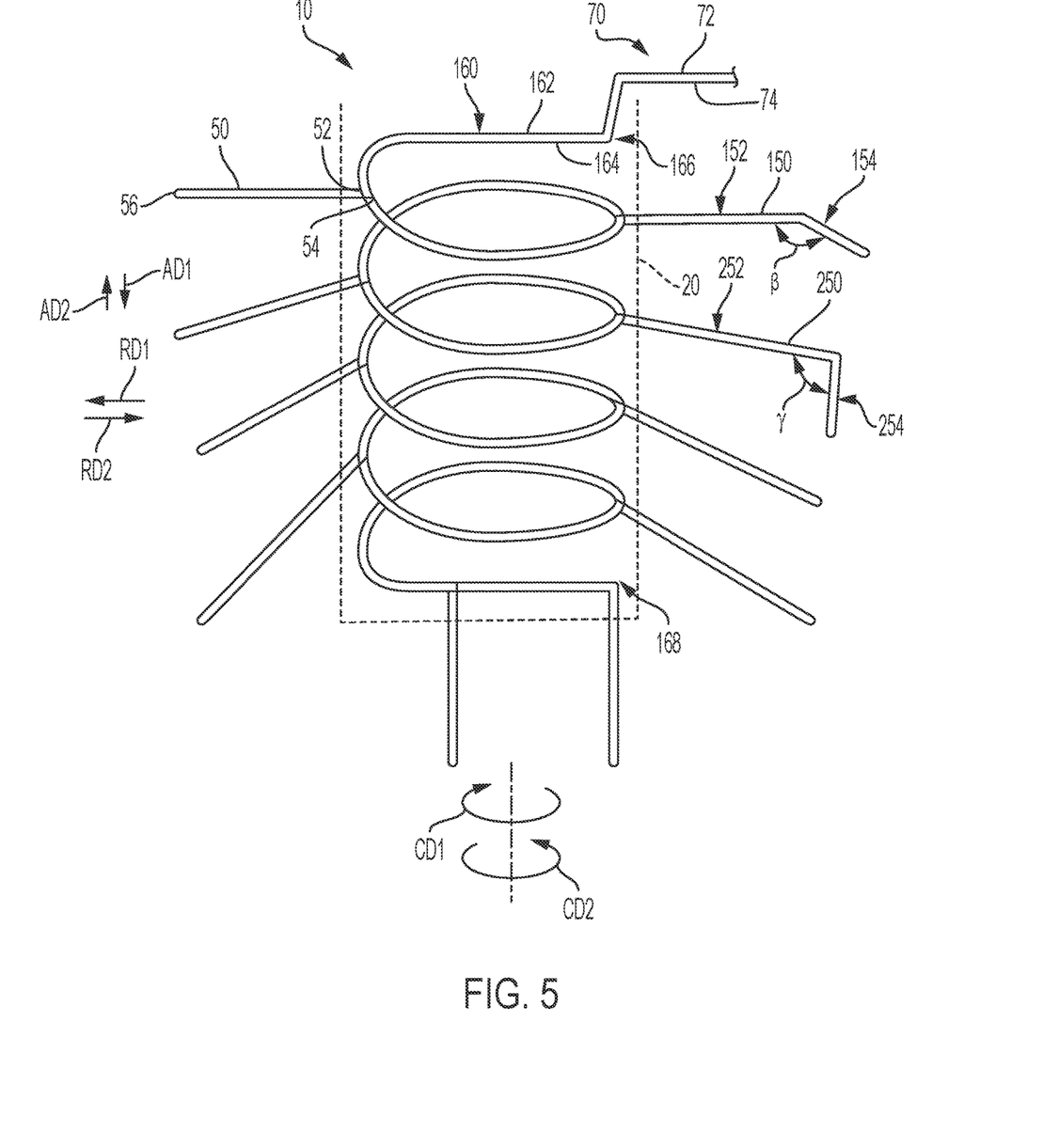
FIG. 5 is a perspective view of a ground-based thermal storage and heat exchange system.

FIG. 5 is a perspective view of ground-based thermal storage and heat exchange system 10, including secondary header 160. Secondary header 160 comprises end 166 connected to primary header 70 and end 168. In some embodiments, and as shown in FIG. 5, system 10 comprises one or more secondary headers 160 arranged as a coil. Such arrangement may resemble or approximate that of a coil spring. For example, secondary headers 160 may comprise a plurality of straight pipe segments (either flexible or rigid) connected by elbows of various radii so as to approximate a coil or spiral. The downward coil shape of secondary header 160 allows for fluid connection of secondary header 160 to U-tubes 50 arranged on different borehole levels. For example, a single secondary supply header 162 extends down through core 20, radially inward of radially inward facing surface 22, and is fluidly connected to ends 52 of the U-tubes 50 on multiple U-tube levels and at various circumferential locations about core 20. Similarly, a single secondary return header 164 extends down through core 20, radially inward of radially inward facing surface 22, and is fluidly connected to ends 54 of the U-tubes 50 on multiple U-tube levels and at various circumferential locations about core 20. The coil arrangement of secondary header 160 may exhibit greater heat transfer capabilities since fluid within secondary header 160 remains within core 20 for a longer period of time than, for example, the vertical arrangement of secondary header 60. In some embodiments, the diameter of secondary header 160 varies. For example, in some embodiments the diameter of secondary supply header 162 and/or secondary return header 164 decreases in axial direction AD1. In some embodiments, the diameter of secondary supply header 162 and/or secondary return header 164 increases in axial direction AD1. In some embodiments, the diameter of secondary supply header 162 and secondary return header 164 is constant.

Also shown in FIG. 5 is various embodiments of U-tubes. In some embodiments, core 20 comprises one or more U-tubes 150 comprising section 152 and section 154. U-tubes 150 are substantially similar to U-tubes 50 in how they connect to secondary header 60, 160, 260, but exhibit a different geometrical shape in order to achieve optimal heat transfer characteristics. Section 154 is connected to and arranged at an angle ß with respect to section 152. In some embodiments, angle β is greater than 0 degrees and less than 180 degrees (e.g., 120 degrees). For example, section 152 may be arranged at 90 degrees with respect to radially outward facing surface 24 of core 20, and section 154 may extend radially outward in axial direction AD1 from the distal end of section 152 (i.e., at an acute angle with respect to radially outward facing surface 24). In some embodiments, section 152 may extend radially outward in axial direction AD1 (i.e., at a downward acute angle with respect to radially outward facing surface 24), and section 154 may extend radially outward in axial direction AD1 from the distal end of section 152 (i.e., at an acute angle with respect to radially outward facing surface 24).

In some embodiments, core 20 may also comprise one or more U-tubes 250 comprising section 252 and section 254. U-tubes 250 are substantially similar to U-tubes 50 in how they connect to secondary header 60, 160, 260, but exhibit a different geometrical shape in order to achieve optimal heat transfer characteristics. Section 254 is connected to and arranged at an angle γ with respect to section 252. In some embodiments, angle γ is greater than 0 degrees and less than 180 degrees (e.g., 100 degrees). For example, section 252 may be arranged at 60 degrees with respect to radially outward facing surface 24 of core 20, and section 254 may extend in axial direction AD1 from the distal end of section 252 (i.e., at 0 degrees with respect to radially outward facing surface 24). In some embodiments, section 252 may extend radially outward in radial direction RD1 (i.e., at 90 degrees with respect to radially outward facing surface 24), and section 254 may extend in axial direction AD1 from the distal end of section 252 (i.e., at 0 degrees with respect to radially outward facing surface 24). In some embodiments, section 252 may extend radially outward in axial direction AD1 (i.e., at an acute angle with respect to radially outward facing surface 24), and section 254 may extend in radial direction RD1 from the distal end of section 252 (i.e., at 90 degrees with respect to radially outward facing surface 24).

Figure 6:
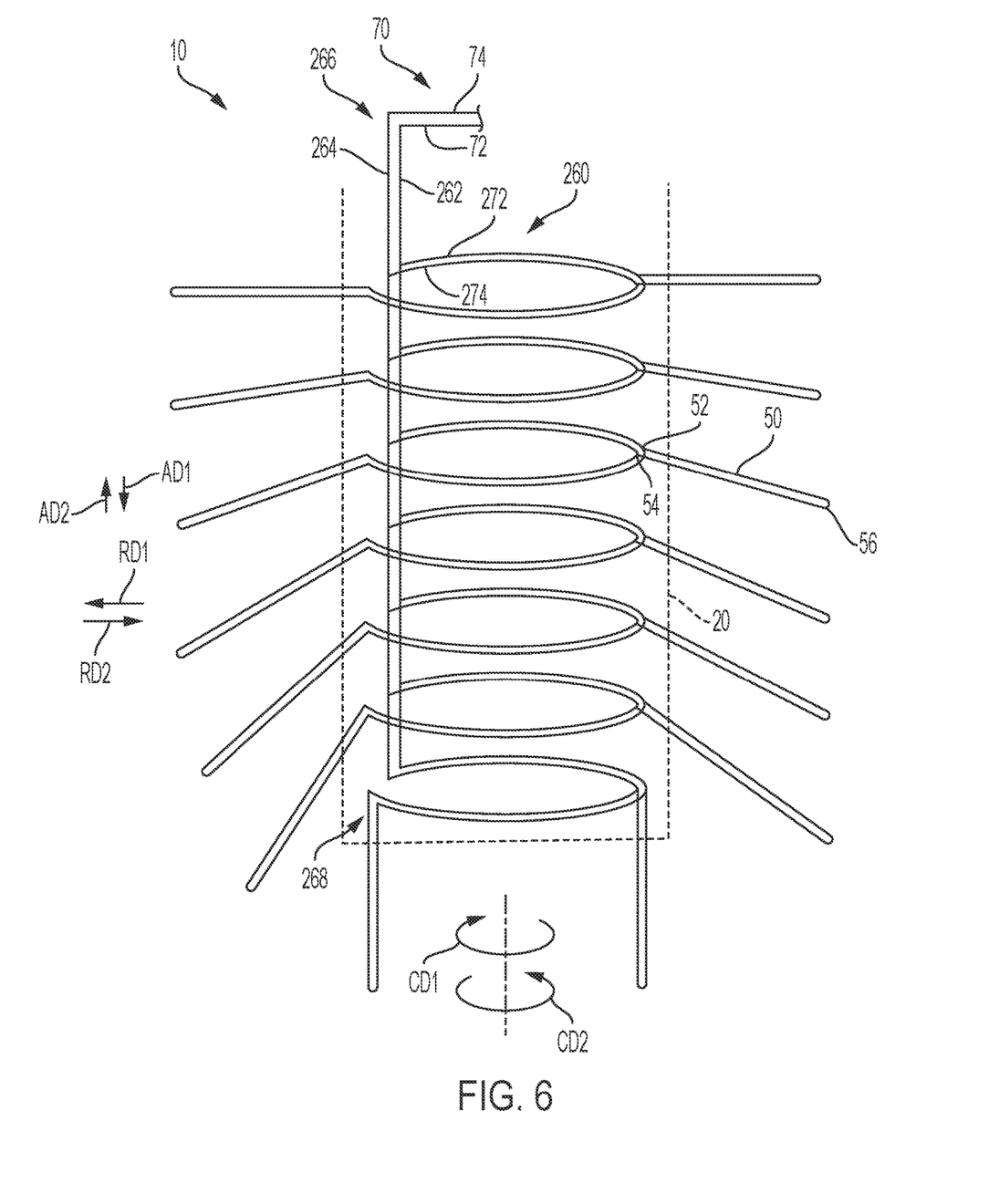
FIG. 6 is a perspective view of a ground-based thermal storage and heat exchange system.

FIG. 6 is a perspective view of ground-based thermal storage and heat exchange system 10, including secondary header 260. Secondary header 260 comprises end 266 connected to primary header 70 and end 268. In some embodiments, and as shown in FIG. 6, secondary header 260 comprises vertically arranged secondary supply header section 262 and vertically arranged secondary return header section 264. Vertically arranged secondary header sections 262 and 264 extend in axial direction AD1 the length of a plurality of U-tube levels. At or approximate each borehole level, secondary header 260 further comprises tertiary supply header section or tertiary supply header 272 and secondary return header section or tertiary return header 274. Secondary header sections 272 and 274 are circumferentially arranged to connect to at least one, or in some embodiments every, U-tube 50 in a given U-tube level. Vertical secondary header sections 262 and 264 tie together each circumferential horizontal secondary header sections 272 and 274. In some embodiments, the diameter of secondary header 260 varies. For example, in some embodiments the diameter of secondary supply header section 262, 272 and/or secondary return header section 264, 274 decreases in axial direction AD1. In some embodiments, the diameter of secondary supply header section 262, 272 and/or secondary return header section 264, 274 increases in axial direction AD1. In some embodiments, the diameter of secondary supply header section 262, 272 and secondary return header section 264, 274 is constant.

Figure 7:
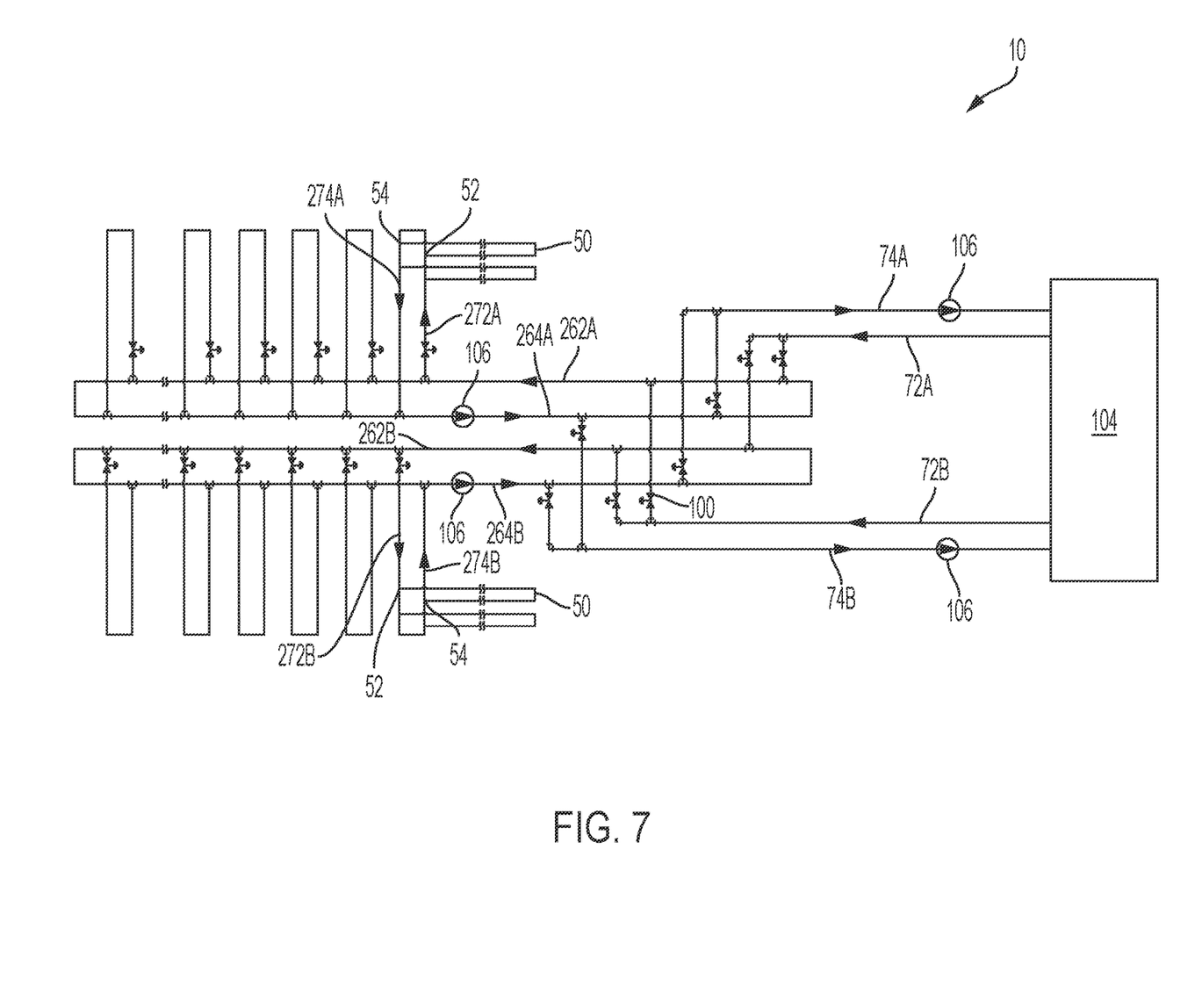
FIG. 7 is a schematic view of the ground-based thermal storage and heat exchange system shown in FIG. 6.

FIG. 7 is a schematic view of ground-based thermal storage and heat exchange system 10. As shown, In some embodiments system 10 may comprise two sets of primary headers and two sets of secondary headers for heating and cooling. For example, primary supply header 72A and primary return header 74A are fluidly connected to secondary supply header section 262A and secondary return supply header section 264A, which are fluidly connected to secondary supply header section or tertiary supply header 272A and secondary return header section or tertiary supply header 274A, respectively, all of which are used for heating. Primary supply header 72B and primary return header 74B are fluidly connected to secondary supply header section 262B and secondary return supply header section 264B, which are fluidly connected to secondary supply header section or tertiary supply header 272B and secondary return header section or tertiary supply header 274B, respectively, all of which are used for cooling. As shown, U-tubes 50 are connected to respective tertiary headers 272A, 272B, 274A, 274B. Valves 100 are arranged throughout system 10 and may be used to isolate various tertiary headers and/or the cooling or heating loop. Primary headers 72A, 72B, 74A, 74B may be connected to component 104 (e.g., a heat pump, chiller, heat exchanger, building, etc.).

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

2 Earth
2A Topsoil
2B Overburden
2C Bedrock
4 Grade
10 Ground-based thermal storage and heat exchange system
20 Core
22 Radially inward facing surface
24 Radially outward facing surface
26 Top or top surface
28 Bottom or bottom surface
30 Space
32 Through-bores
34 Through-bores
40 Borehole field or boreholes
42 Borehole
42A-J Boreholes
44 Grout
46 Tieback or helical tieback
50 U-tube
52 End
54 End
56 Bend
60 Secondary header
62 Secondary supply header
64 Secondary return header
66 End
68 End
70 Primary header
72 Primary supply header
72A Primary supply header
72B Primary supply header
74 Primary return header
74A Primary return header
74B Primary return header
80 Auxiliary heat transfer equipment or storage tank
82 Storage tank outer wall
84 Storage tank distribution piping
86 Diffuser
92 Conduit
94 Conduit
100 Valves
102 Component
104 Component
106 Pump
150 U-tube
152 Section
156 Section
160 Secondary header
162 Secondary supply header
164 Secondary return header
166 End
168 End
250 U-tube
252 Section
256 Section
260 Secondary header 262 Secondary supply header section
264 Secondary return header section
266 End
268 End
272 Secondary supply header section or tertiary header
272A Secondary supply header section or tertiary header
272B Secondary supply header section or tertiary header
274 Secondary return header section or tertiary header
274A Secondary return header section or tertiary header
274B Secondary return header section or tertiary header
AD1 Axial direction
AD2 Axial direction
CD1 Circumferential direction
CD2 Circumferential direction
D1 Distance
D2 Distance
D3 Distance
RD1 Radial direction
RD2 Radial direction
α Angle

What is claimed is:

1. A ground-based thermal storage and heat exchange system, comprising:
 a core, including:
  a top;
  a bottom;
  an outward facing surface;
  an inward facing surface; and
  a space formed between the top, the bottom, and the inward facing surface; and
 a plurality of U-tubes extending outward from the core; wherein a fluid is pumped through the core and the plurality of U-tubes.

2. The system as recited in claim 1, wherein each U-tube of the plurality of U-tubes extends through a respective through-bore in the core.

3. The system as recited in claim 2, wherein each U-tube of the plurality of U-tubes comprises:
 a first end arranged in the space;
 a second end arranged in the space; and
 a bend arranged outward of the outward facing surface.

4. The system as recited in claim 3, further comprising:
 at least one supply header fluidly connected to the first end of the one or more U-tubes; and
 at least one return header fluidly connected to the second end of the one or more U-tubes.

5. The system as recited in claim 3, further comprising:
 a primary header; and
 at least one secondary header including a first end connected to the primary header and a second end, the secondary header arranged to transfer the fluid between the primary header and the plurality of U-tubes.

6. The system as recited in claim 5, wherein the at least one secondary header comprises:
 a vertically arranged secondary supply header; and
 a vertically arranged secondary return header.

7. The system as recited in claim 6, wherein the at least one secondary header further comprises:
 a horizontally arranged secondary supply header fluidly connected to the vertically arranged secondary supply header; and
 a horizontally arranged secondary return header fluidly connected to the vertically arranged secondary return header.

8. The system as recited in claim 5, wherein the at least one secondary header is arranged as a coil within the space.

9. The system as recited in claim 1, further comprising an auxiliary heat transfer apparatus arranged in the space.

10. The system as recited in claim 1, wherein the core is a wet well.

11. The system as recited in claim 1, wherein the core is a caisson.

12. The system as recited in claim 1, wherein the core is arranged completely in earth.

13. The system as recited in claim 12, wherein each U-tube of the plurality of U-tubes is arranged in a borehole in the earth.

14. The system as recited in claim 1, wherein the plurality of U-tubes are arranged in a plurality of levels, wherein each level of the plurality of levels is arranged at a distinct elevational position.

15. The system as recited in claim 14, wherein the plurality of levels comprises:
 a first level spaced apart from the top in a first axial direction, wherein U-tubes in the first level are arranged substantially perpendicular to the outward facing surface;
 a second level spaced apart from the first level in the first axial direction, wherein U-tubes in the second level are arranged at an acute angle relative to the outward facing surface; and
 a third level spaced apart from the second level in the first axial direction, wherein the U-tubes in the third level are arranged substantially parallel to the outward facing surface.

16. A thermal storage and heat exchange system arranged at least partially in earth, comprising:
 a core, including:
  a top;
  a bottom;
  an outward facing surface;
  an inward facing surface; and
  a space formed between the top, the bottom, and the inward facing surface; and
 a plurality of U-tubes extending outward from the core into a borehole in the earth and comprising:
  a first end arranged in the space;
  a second end arranged in the space; and
  a bend arranged in the earth;
 wherein a fluid is pumped through the core and the plurality of U-tubes.

17. The system as recited in claim 16, wherein each U-tube is fluidly connected to a primary header via one or more secondary headers arranged at least partially in the space.

18. The system as recited in claim 16, wherein:
 the plurality of U-tubes are spaced apart from each other and arranged in a plurality of levels; and
 each level of the plurality of levels is arranged at a distinct elevational position with respect to the core.

19. The system as recited in claim 18, wherein the plurality of levels comprises:
 a first level spaced apart from the top in a first axial direction, wherein U-tubes in the first level are arranged substantially perpendicular to the outward facing surface;
 a second level spaced apart from the first level in the first axial direction, wherein U-tubes in the second level are arranged at an acute angle relative to the outward facing surface; and a third level spaced apart from the second level in the first axial direction, wherein the U-tubes in the third level are arranged substantially parallel to the outward facing surface.

20. A thermal storage and heat exchange system, comprising:
- a core, including:
  - an outward facing surface; and
  - an inward facing surface forming a space; and
- a plurality of tubes extending outward from the core, each tube of the plurality of tubes comprising:
  - a first end;
  - a second end; and
  - a bend arranged outward of the outward facing surface;

wherein:
  the plurality of tubes are spaced apart from each other and arranged in a plurality of levels; and
  a fluid is pumped through the core and the plurality of tubes.

* * * * *